(12) United States Patent
Wang et al.

(10) Patent No.: US 7,861,149 B2
(45) Date of Patent: Dec. 28, 2010

(54) KEY PHRASE NAVIGATION MAP FOR DOCUMENT NAVIGATION

(75) Inventors: Min Wang, Beijing (CN); Benyu Zhang, Beijing (CN); Hua-Jun Zeng, Beijing (CN); Jian Wang, Beijing (CN); Shiguang Liu, Beijing (CN); Zheng Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 976 days.

(21) Appl. No.: 11/372,365

(22) Filed: Mar. 9, 2006

(65) Prior Publication Data

US 2007/0219945 A1 Sep. 20, 2007

(51) Int. Cl.
G06F 3/048 (2006.01)
G06F 17/30 (2006.01)

(52) U.S. Cl. .......... 715/201; 715/234; 715/244; 715/273; 715/838; 715/854; 707/602; 707/920; 707/999.02; 707/E17.067

(58) Field of Classification Search .......... 715/201, 715/200, 204, 205, 207, 209, 210, 234, 243, 715/244, 245, 246, 247, 251, 253, 256, 273, 715/760, 850, 851, 859, 211, 700, 762, 838, 715/853, 854, 860, 861, FOR. 227, FOR. 228, 715/FOR. 229, FOR. 230; 707/602, 705, 707/706, 737, 738, 920, 969, 970, 973, 999.001, 707/999.003, E17.029, E17.046, E17.089, 707/E17.124, E17.125
See application file for complete search history.

(56) References Cited

U.S. PATENT DOCUMENTS

| | | | |
|---|---|---|---|
| 6,457,026 B1 | 9/2002 | Graham et al. | |
| 6,883,138 B2 * | 4/2005 | Rosenholtz et al. | 715/207 |
| 7,143,362 B2 | 11/2006 | Dieberger et al. | |
| 2002/0076099 A1 * | 6/2002 | Sakamoto et al. | 382/154 |
| 2002/0174101 A1 * | 11/2002 | Fernley et al. | 707/1 |
| 2002/0191031 A1 * | 12/2002 | Ricard | 345/838 |
| 2003/0078913 A1 * | 4/2003 | McGreevy | 707/3 |
| 2003/0097357 A1 * | 5/2003 | Ferrari et al. | 707/3 |
| 2005/0210399 A1 * | 9/2005 | Filner et al. | 715/767 |
| 2006/0026152 A1 | 2/2006 | Zeng et al. | |
| 2007/0011140 A1 | 1/2007 | King et al. | |
| 2008/0104535 A1 | 5/2008 | DeLine et al. | |
| 2009/0193337 A1 | 7/2009 | Carter et al. | |

OTHER PUBLICATIONS

Suh, Bongwon et al., Popout Prism: Adding Perceptual Principles to Overview+Detail Document Interfaces, CHI 2002, Apr. 20-25, 2002, Minneapolis, Minnesota, USA, 8 pages.

Xu, Songhua et al., "A New Visual Search Interface for Web Browsing," WSDM Feb. 9-12, 2009, Barcelona, Spain, 10 pages.

* cited by examiner

*Primary Examiner*—Maikhanh Nguyen
(74) *Attorney, Agent, or Firm*—Perkins Coie LLP

(57) ABSTRACT

Computer-readable media having computer-executable instructions and apparatuses provide a keyphrase navigation map (KNM) for a document page. Keyphrases are extracted from the document page. Keyphrase clusters are subsequently formed by a measure of relevancy, and a salient keyphrase is determined for each cluster. A thumbnail is formed with tags corresponding to the salient keyphrases. A selected tag is expanded with associated keyphrases. An associated keyphrase may be further selected in order to facilitate the navigation of the document page. The displayed tags on the thumbnail are positioned in accordance with locations of associated keyphrases in the document page.

20 Claims, 11 Drawing Sheets

KEY PHRASE NAVIGATION MAP FOR DOCUMENT NAVIGATION

BACKGROUND

With the explosion of the amount of documents and the pages of documents becoming increasing larger and more numerous, readers do not have enough time to navigate the full page but also do not want to lose key information that is contained in a searched document. Users of search engines (e.g., web search engines) are often forced to sift through a long ordered list of search results in the form of documents, snippets, or text fragments, a time-consuming and inconvenient prospect in order to identify relevant topics inside the results. Existing search engines such as Google™, Yahoo™, and MSN™ often return a long list of search results ranked by relevancy to the given query. Web users must then review the list and examine the titles and (short) snippets sequentially in order to identify their desired results. This is an even more time consuming task when multiple sub-topics of the given query are mixed together. For example, when a user submits a query "jaguar" into Google and wants to get search results related to "big cats", the user may need to go to the $10^{th}$, $11^{th}$, $32^{nd}$, and/or $71^{st}$ results.

A user often needs to locate information quickly but effectively. Finding information effectively may not be efficient. For example, a user may sequentially review a document, using a find command in which the document is sequentially searched with an editor for a desired term. The user may consequently review the located section of the document and proceed to locate the next occurrence of the term if the current section is not sufficient. On the other hand, accelerating the search procedure may result in reducing the efficacy of the search.

Being able to navigate documents in an effective and efficient manner is becoming more important with the increasing number of available documents on networked computer systems. Enhanced document navigation would help in facilitating information retrieval.

SUMMARY

A keyphrase navigation map (KNM) is provided for a document page. Keyphrases are extracted from the document page. Keyphrase clusters are subsequently formed by a measure of relevancy, and a salient keyphrase is determined for each cluster. A thumbnail is formed with tags corresponding to the salient keyphrases. A selected tag is expanded with associated keyphrases. An associated keyphrase may be further selected in order to facilitate the navigation of the document page. The displayed tags on the thumbnail are positioned in accordance with locations of associated keyphrases in the document page.

This Summary is provided to introduce a selection of concepts in a simplified form that are further described below in the Detailed Description. This Summary is not intended to identify key features or essential features of the clamed subject matter, nor is it intended to be used as an aid in determining the scope of the claimed subject matter.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

DETAILED DESCRIPTION

Aspects of the present invention relate to distinguishing the script type of at least one portion of a writing input.

The following is separated by subheadings for the benefit of the reader. The subheadings include: Terms, General-Purpose Computer, Architecture of Keyphrase Extraction Navigation Map System, Cluster Engine, Map Engine, Exemplary Screen Shots, and Utility Testing.

TERMS

Thumbnail: A miniature representation of a page or image. A thumbnail program may be stand-alone or part of a desktop publishing or graphics program. Thumbnails provide a convenient way to browse through multiple images before retrieving the one you need. Programs often permit a user to click on the thumbnail to retrieve it.

Scroll Bar: A bar that appears on the side or bottom of a window to control and view which part of document is currently in the window's frame.

Snippet: A segment of a document. For example, a snippet may be a set of contiguous text.

General Purpose Computer

Figure 1:
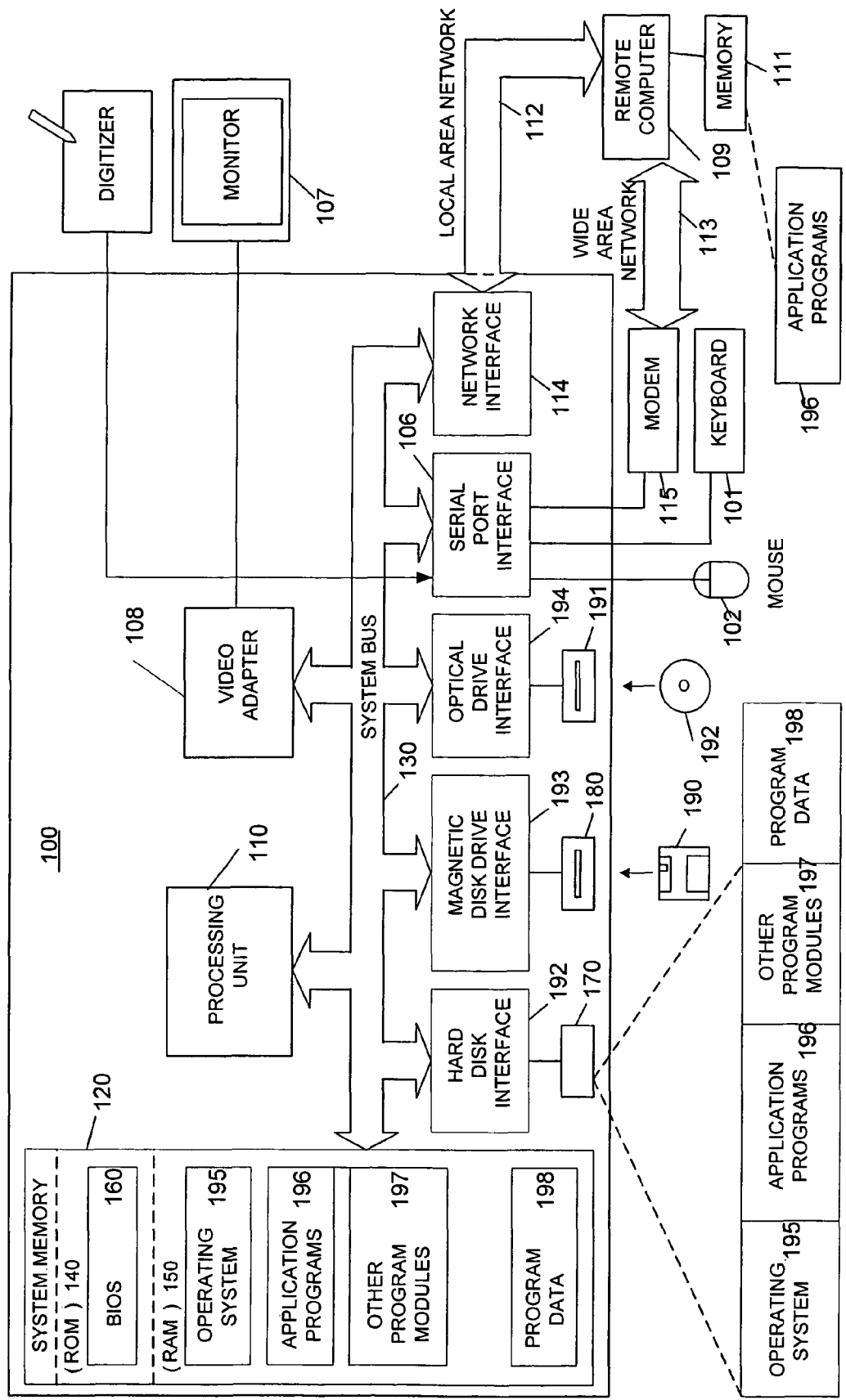
FIG. 1 is a functional block diagram of an example of a conventional general-purpose digital computing environment that can be used to implement various aspects of the present invention.

FIG. 1 is a functional block diagram of an example of a conventional general-purpose digital computing environment that can be used to process a writing input from a Pen (e.g., stylus 166). In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

In an embodiment, as will be discussed in further detail, computer system 100 accesses a document from hard disk drive 170 or from a remote computer (e.g., remote computer 109 through the Internet). Computer system 100 displays a portion of the document with navigation information on monitor 107. Computer system 100 may navigate the document in accordance with selections provided by a user through mouse 102 and/or keyboard 101. Computer system 100 searches the document and displays the results on monitor 107. A discussion of methods, apparatuses, and computer media for navigating a document by computer system 100 will presented in greater detail.

Architecture of Keyphrase Extraction Navigation Map (KNM) System

Figure 2:
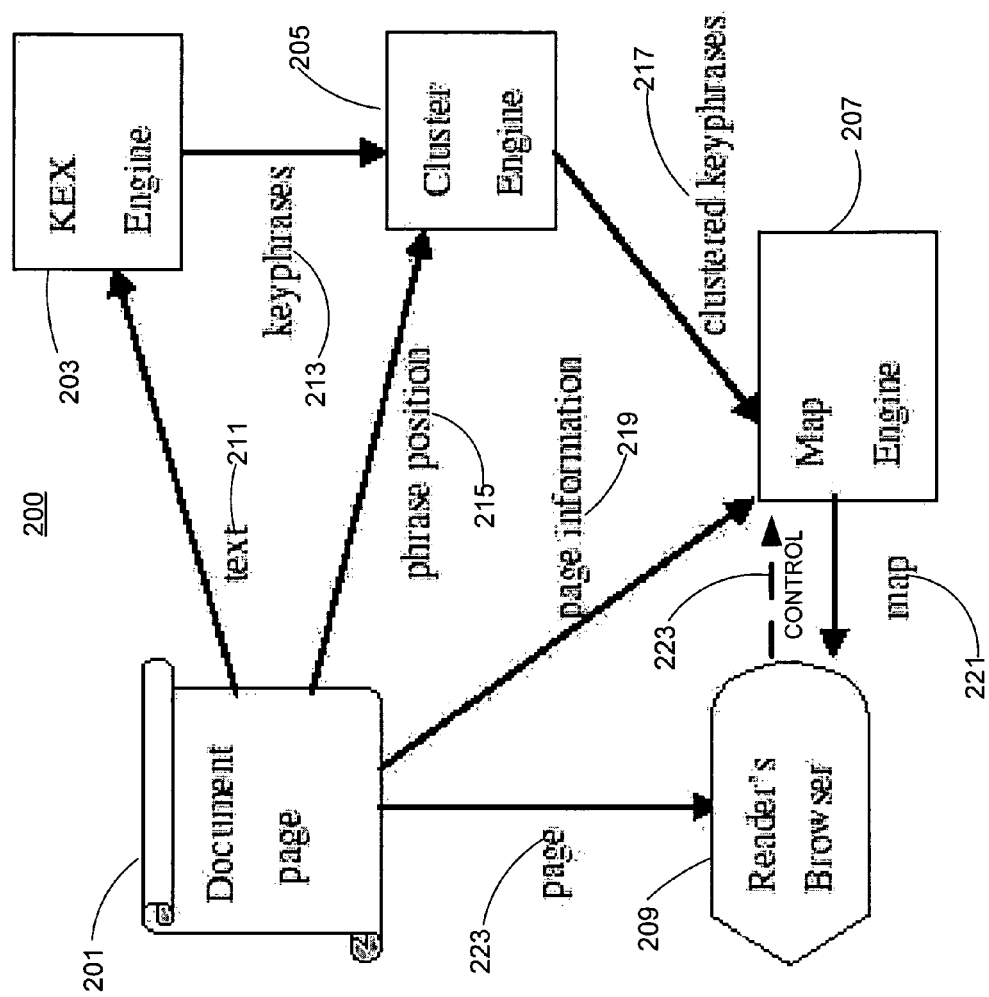
FIG. 2 shows an architecture of a keyphrase extraction navigation map (KNM) system in accordance with an illustrative aspect of the present invention.

FIG. 2 shows an architecture of keyphrase extraction navigation map (KNM) system 200 in accordance with an illustrative aspect of the present invention. Interaction between components of KNM system 200 involves both data information as well as control information. The core components of KNM system 200 are KEX engine 203, cluster engine 205, and map engine 207. Document page 201 is what reader desires to navigate as viewed on reader's browser 209 (e.g., Microsoft® Internet Explorer). Arrowed lines between the entities of KNM system 200 represent interaction between the entities, in which the corresponding labels represent the associated data flow. Processing is initiated by data flow from document page 201 and is completed by data flowing to reader's browser 209. Data to browser 209 may be provided in two ways:

- through a direct presentation from document page 201 as represented by page data flow 223
- from map engine 207 by map data flow 221.

KNM system 200 incorporates three engines:

- KEX engine 203, which is the main engine of KNM system 200, extracts keyphrases 213 from text 211 extracted from document page 201 using a statistical method (e.g., a regression model). KEX engine 203 not only extracts keyphrases 213 but also ranks keyphrase 213 by salient score as will be discussed.
- Cluster Engine 205 clusters keyphrases 213 sent by KEX Engine 203 into clustered keyphrases 217 by phrase relevancy into several topical groups. The phrases relevancy is determined not only by the component words of the keyphrases but also by phrase position information 215.
- Map Engine 207, which receives clustered keyphrases 217 from cluster engine 205 and page information 219 from document page 201, draws the salient keyphrase from the topical group on a thumbnail in suitable position on a display device, and responds to reader's runtime action on the map at any moment through control interface 223.

Each engine executes a process, e.g., process 300 that is executed by cluster engine 205 as will be discussed. When a reader wants to navigate document page 201 by the KNM system 200, KEX Engine 203 extracts the keyphrases from document page 201. KEX engine 203 subsequently sends keyphrases 213 and corresponding rank scores to cluster engine 205. Cluster engine 205 clusters keyphrases 213 into several topical groups by analyzing the relevancy of keyphrases 213 and associated phrase position information 215 from page document 201. After clustering, cluster engine 205 tags one hot keyphrase (salient keyphrase) in each topical group and sends all of the clustered keyphrases 217 to map engine 207. Map engine 207 forms a thumbnail from document page 201 and computes the coordinates of the each keyphrase in map in relation to an origin position in document page 201. (A keyphrase may occur one than once in document page 201. The coordinates of each occurrence of the keyphrase is determined.) The reader may interact with map engine 207 through control interface 223 to navigate and select information from document page 201. Thus, KNM system 200 is an assistant system for a reader navigating through documents. In essence, KNM system 200, which lets reader participate in the selection of the results of summarization, provides a compromise between time and accuracy.

Cluster Engine

The contents of U.S. patent Ser. No. 10/889,841 filed on Jul. 13, 2004 ("Query-Based Snippet Clustering for Search Result Grouping") is incorporated herein by reference, as if fully set forth below.

Figure 3:
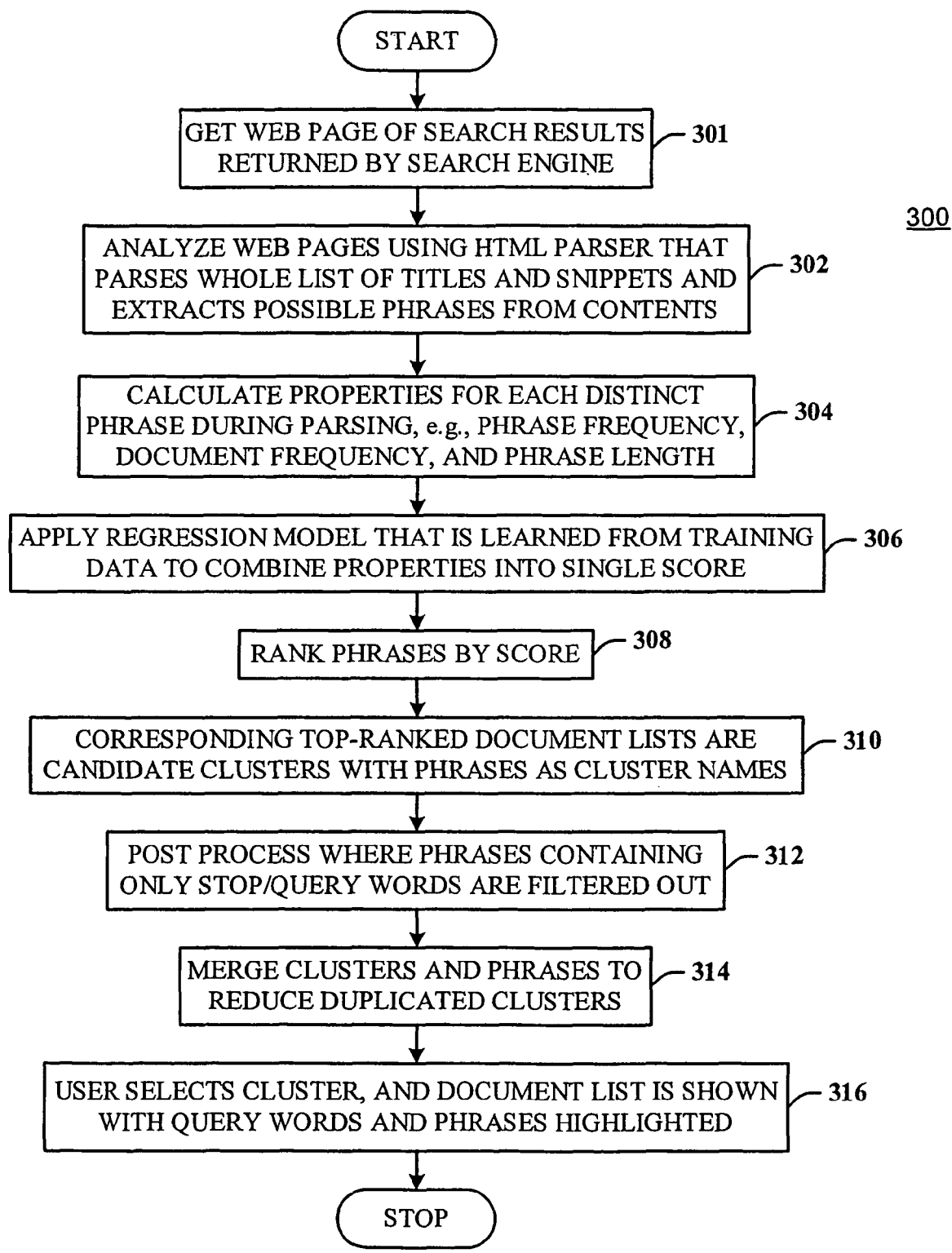
FIG. 3 shows a flow diagram for logic performed by a cluster engine in accordance with an illustrative aspect of the present invention.

FIG. 3 illustrates flow chart 300 of one methodology for search result clustering and naming in accordance with the present invention. Generally, the search result clustering problem is reformalized as a salient phrases ranking problem. Thus, an unsupervised clustering problem is converted to a supervised learning problem. Given a query and the ranked list of search results, a whole list of titles and snippets is parsed, all possible phrases (n-grams) are extracted from the contents, and several properties are calculated for each phrase, e.g., phrase frequencies, document frequencies, and phrase length. A regression model learned from training data that is collected in advance is then applied to combine these properties into a single salience score. The phrases are ranked according to the salience score, and the top-ranked phrases are taken as salient phrases. The salient phrases are, in fact, the names of candidate clusters, which are further merged according to their corresponding documents.

The disclosed invention converts the conventional unsupervised clustering problem into a supervised ranking problem. More precisely, consider an original ranked list of search results R={r(d_i|q)}, where q is current query, d_i is a document, and r is some (unknown) function which calculates the probability that $d_i$ is relevant to q. Traditional clustering techniques attempt to find a set of topic-coherent clusters C according to query q. Each cluster is associated with a new document list, according to the probability that $d_i$ is relevant to both q and current cluster:

$$C=\{R_j\}, \text{ where } R_j=\{r(d_i|q,R_j)\} \quad \text{(EQ. 1)}$$

In contrast, the method, according to an embodiment, seeks to find a ranked list of clusters C', with each cluster associated with a cluster name, as well as, a new ranked list of documents:

$$C'=\{r'(c_k,R_k|q)\}, \text{ where } R_k=\{r(d_i|q,c_k)\} \quad \text{(EQ. 2)}$$

As shown from the above equations, the present invention modifies the definition of clusters by adding cluster names $c_k$, and emphasizes the ranking thereof by a function r', in order to improve the readability of clusters. Since the requirement of topic-coherence of clusters is eliminated, the complexity of the algorithm is substantially reduced. Non-topic coherence is not a drawback of the present invention because it does not affect the efficiency of user browsing behavior.

Generally, the algorithm of the present invention is composed of the four parts: search result fetching, document parsing and phrase property calculation, salient phrase ranking, and post-processing.

More specifically, at 301, a page (e.g., a web page) of search results is returned by a search engine. At 302, the web pages can be analyzed by an HTML (HyperText Markup Language) parser and result items are extracted. Generally, there are only titles and query-dependent snippets available in each result item. It is assumed that these result item contents are sufficiently informative because most search engines are well designed to facilitate a user's relevance judgment only by the title and snippet. Thus, the engine is capable of presenting the most relevant contents for a given query. Each extracted phrase is in fact the name of a candidate cluster, which corresponds to a set of documents that contain the phrase. At 304, several properties for each distinct phrase are calculated during the parsing, including but not limited to, phrase frequency, document frequency, and phrase length. These properties are described in greater detail hereinbelow.

In the parsing process, titles, and snippets are weighted differently, since it is assumed that there is a higher probability that salient phrases occur in titles. Thus, for example, keywords occurring in a title can be weighted higher. Stemming is applied to each word using Porter's algorithm. The stop words are included in n-gram generation, so that they could be shown when they are adjacent to meaningful keywords in cluster names. In post-processing, pure stop words are filtered out. For the same reason, the query words are also included in the parsing but are filtered out in the post-processing. Given the properties, a regression model is utilized that is learned from training data collected in advance, to combine these properties into a single salience score, as indicated at 306. At 308, the salience phrases are then ranked by the score in descending order. After salient phrases are ranked, the corresponding document lists constitute the candidate clusters, with the salient phrases being cluster names, as indicated at 310.

At 312, in post-processing, the phrases that contain only stop words or the query words are filtered out. At 314, the clusters and phrases are merged to reduce duplicated clusters. Specifically, if the overlapped part of two clusters exceeds a certain threshold, they are merged into one cluster. Meanwhile, the cluster names are adjusted according to the new generated cluster. Finally, the topmost clusters are shown to user.

At 316, when a user selects a cluster, the corresponding document list is shown to the user, with both query words and salient phrases highlighted. This document list could be in the original order, or be re-ranked according to the associated salient phrase. The process then reaches a Stop block.

Figure 4:
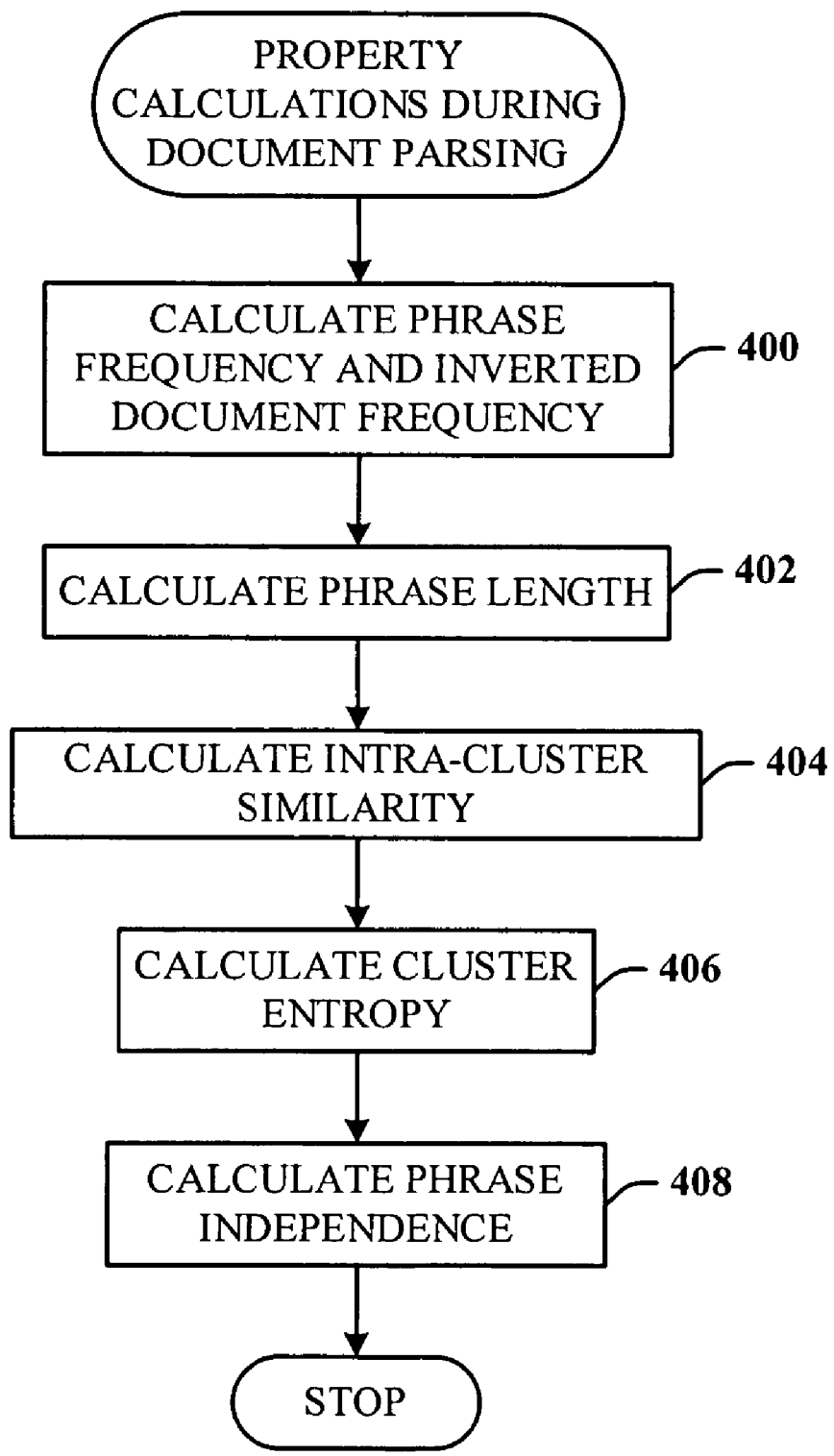
FIG. 4 shows a flow diagram for calculating properties during document parsing in accordance with an illustrative aspect of the present invention.

FIG. 4 shows a flow diagram for calculating properties during document parsing in accordance with an illustrative aspect of the present invention. Listed are five properties that are calculated during document parsing. These properties are relative to the salience score of phrases. In the following description, the current phrase (an n-gram) is denoted w, and the set of documents that contains w is denoted D(w).

At 400, the phrase frequency and inverted document frequency is calculated just as the traditional meaning of Term Frequency/Inverted Document Frequency (TFIDF).

$$TFIDF = f(w) \cdot \log\frac{N}{|D(w)|} \quad \text{(EQ. 3)}$$

where f represents frequency calculation.

At 402, the phrase length is calculated. Intuitively, more frequent phrases are more likely to be better candidates of salient phrases, while phrases with higher document frequency might be less informative to represent a distinct topic. The phrase length property (denoted by LEN) is simply the count of words in a phrase. For example, LEN("big")=1 and LEN("big cats")=2. Generally, a longer name is preferred for user browsing.

Intuitively, if a phrase is a good representation of a single topic, the documents that contain the phrase will be similar to each other. At 404, Intra-Cluster Similarity (ICS) is used to measure the content compactness of documents that contain the phrase. First, documents are converted into vectors in the vector space model: $d_i=(x_{i1}, x_{i2}, \ldots)$. Each component of the vectors represents a distinct unigram, and is typically weighted by TFIDF. For each candidate cluster, its centroid is calculated as follows:

$$o = \frac{1}{|D(w)|} \sum_{d_i \in D(w)} d_i \qquad (EQ.\ 5)$$

ICS is calculated as the average cosine similarity between the documents and the centroid. Accordingly, $$ICS = \frac{1}{|D(w)|} \sum_{d_i \in D(w)} \cos(d_i, o) \qquad (EQ.\ 6)$$

At 406, Cluster Entropy (CE) is employed to represent the distinctness of a phrase. For given phrase w, the corresponding document set D(w) might overlaps with other document sets $D(w_i)$ where $w_i \neq w$. At one extreme, if D(w) is evenly distributed in $D(w_i)$, w might be a too general phrase to be a good salient phrase. At the other extreme, if D(w) seldom overlaps with $D(w_i)$, w may have some distinct meaning. Consider a query "jaguar", for example. The terms "big cats" seldom co-occur with other salient keywords such as "car", "mac os", etc. Therefore, the corresponding documents can constitute a distinct topic. However, "clubs" is a more general keyword which can occur with both "car" and "mac os", thus it will have a less salience score. CE is defined as follows, where 0·log 0=0.

$$CE = -\sum_t \frac{|D(w) \cap D(t)|}{|D(w)|} \log \frac{|D(w) \cap D(t)|}{|D(w)|} \qquad (EQ.\ 7)$$

At 408, phrase independence is calculated. According to the ranked list of clusters C' described hereinabove, a phrase is independent when the entropy of its context is high (i.e., the left and right contexts are sufficiently random). IND is used to measure the independence of phrases. Following is the equation for $IND_l$ that is the independence value for left context, where l(w) is the set of surrounding words immediately left to w.

$$IND_l = -\sum_{t \in l(w)} \frac{f(t)}{TF} \log \frac{f(t)}{TF} \qquad (EQ.\ 8)$$

The $IND_r$ value for right context could be calculated similarly. The final IND value is the average of those two.

$$IND = \frac{IND_l + IND_r}{2} \qquad (EQ.\ 9)$$

Given the above properties, a single formula may be utilized to combine the properties and calculate a single salience score for each phrase. However, this can be too heuristic to be adaptive for different domains. In accordance with the present invention, however, some training data is utilized to learn a regression model.

Regression is a classic statistical problem which tries to determine the relationship between two random variables $x=(x_1, x_2, \ldots, x_p)$ and y. In this case, the independent variable x can be just the vector of the properties (e.g., five, as indicated hereinabove): x=(TFIDF, LEN, ICS, CE, IND), and the dependent y can be any real-valued score. Salient keywords are sorted in a descending order using y, thus, the most salient keywords are shown on the top. In an embodiment of the invention, the regression model utilizes linear regression.

Map Engine

Figure 5:
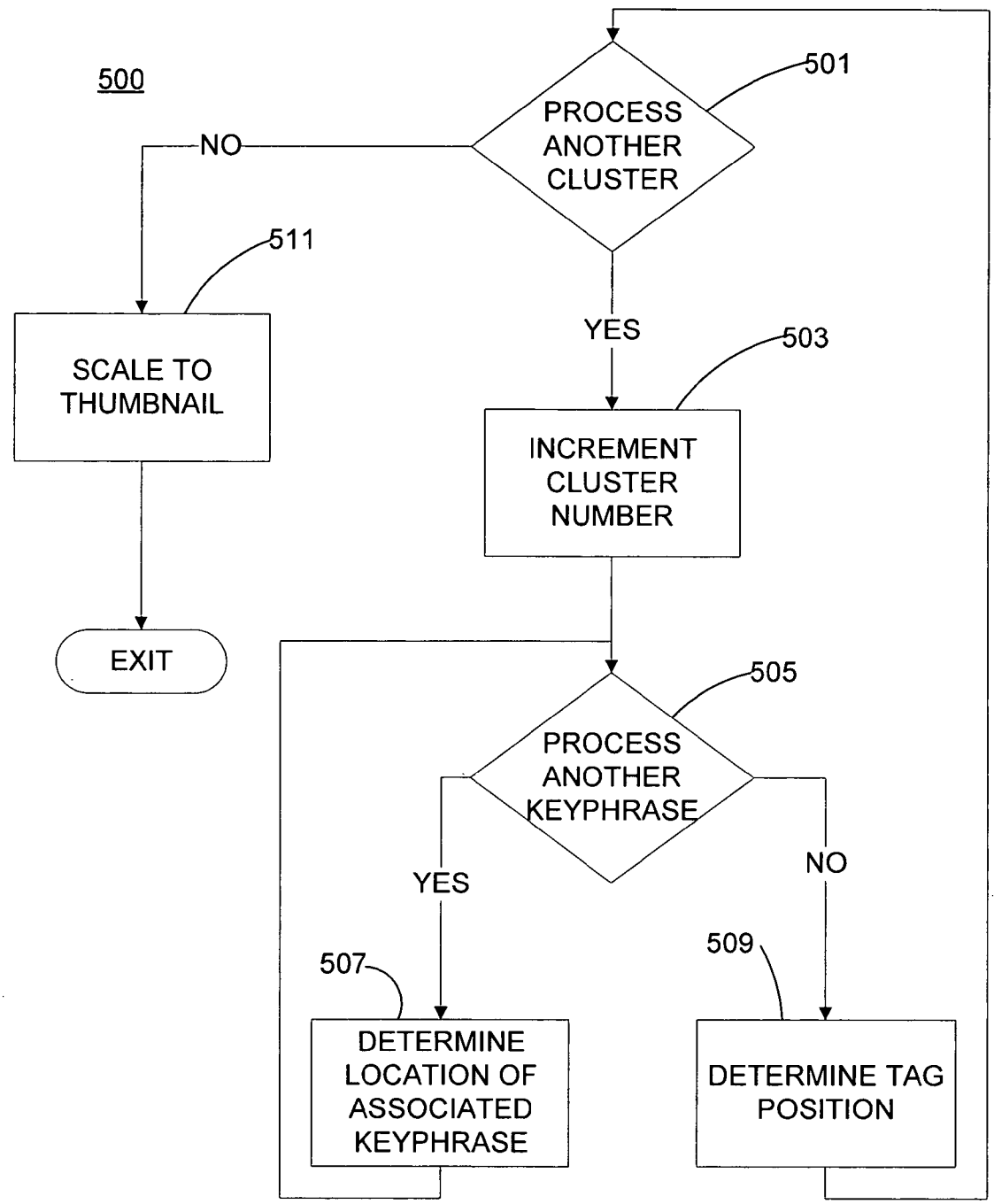
FIG. 5 shows a flow diagram for logic performed by a map engine for determining tag positions for corresponding clusters in accordance with an illustrative aspect of the invention.
Figure 7:
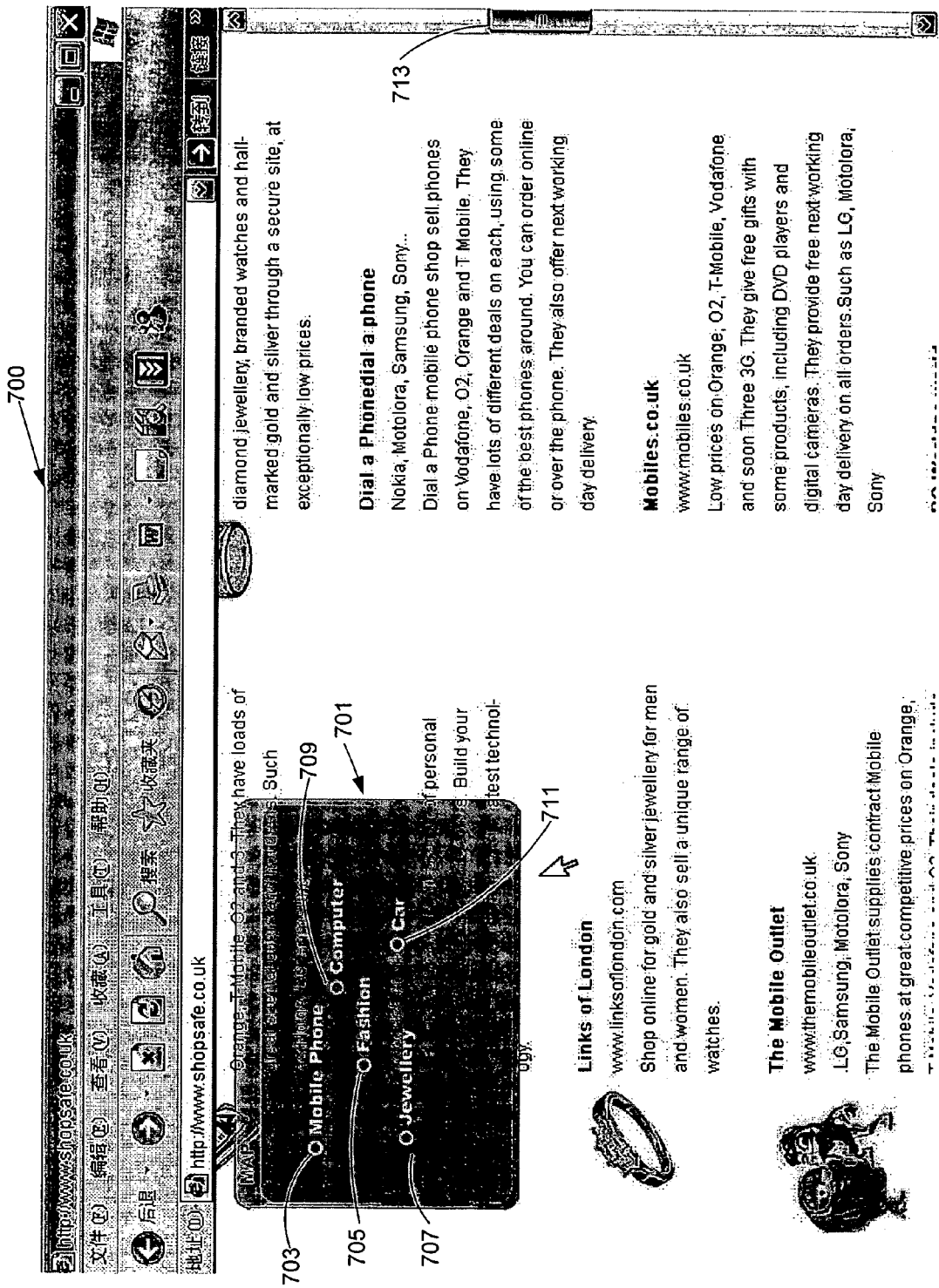
FIG. 7 shows a screen shot with a thumbnail providing a keyphrase extraction navigation map in accordance with an illustrative aspect of the present invention.

FIG. 5 shows flow diagram 500 for logic performed by map engine 207 for determining tag positions of corresponding clusters in accordance with an illustrative aspect of the invention. (However, with an embodiment of the invention, a designed layout may be used to show the keyphrases. Consequently, the tag positions may be determined by the designed layout.) As will be discussed, a tag is formed for a salient keyword of each cluster within a thumbnail on a display device. An exemplary screen shot is shown in FIG. 7.

Step 501 determines whether to process another cluster as provided by cluster engine 205 in clustered keyphrases 217 as shown in FIG. 2. If so, the cluster number j, which identifies the cluster, is incremented in step 503. Locations of each associated keyphrase (as identified by an index i) in cluster j is determined in relation to an origin point of document page 201 by repeating step 507. (If a keyphrase occurs multiple times in a cluster, the location of each occurrence of the keyphrase is determined.)

A tag of each cluster is formed for display on a display device. The position of a tag is determined in step 509. In an embodiment, a tag position is determined by averaging the locations of associated keywords in the associated $j^{th}$ cluster, where the number of keyphrases or the number of keyphrase occurrences (if a keyphrase occurs more than once) equals M. If each location of the $i^{th}$ keyphrase represented by horizontal component $x_i$ and by vertical component $y_i$, the position, as represented by $(X_j, Y_j)$, of the $j^{th}$ cluster is determined by:

$$X_j = \frac{1}{M} \sum_{i=1}^{M} x_i \qquad (EQ.\ 10a)$$

$$Y_j = \frac{1}{M} \sum_{i=1}^{M} y_i \qquad (EQ.\ 10b)$$

When the positions of the tags are determined by step 509, the positions of the tags may be scaled for the dimensions of a thumbnail in step 511. Typically, the dimensions of a displayed thumbnail are smaller than the dimensions of the displayed document page, e.g., as shown in screen shot 700 that illustrates thumbnail 701.

Figure 6:
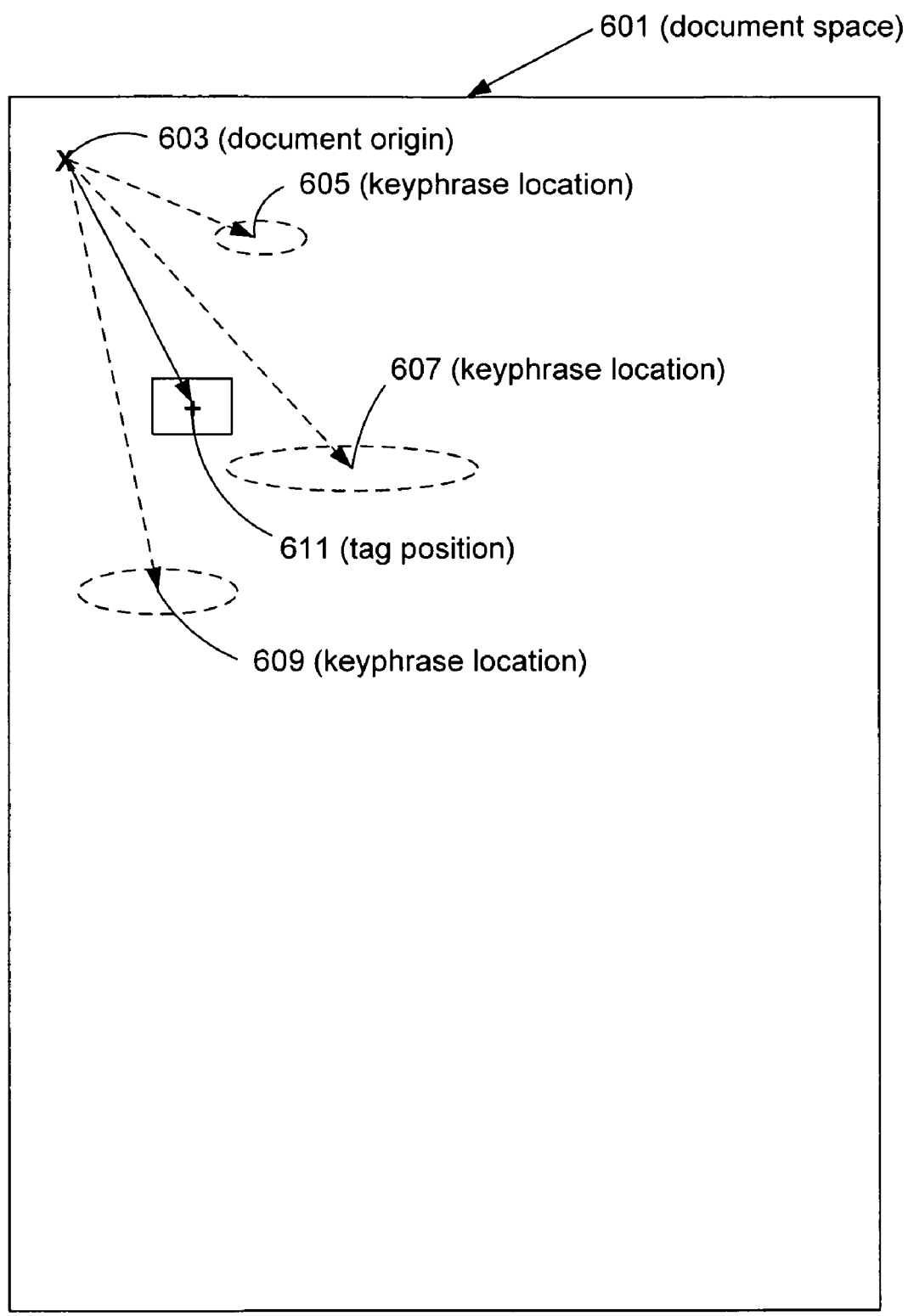
FIG. 6 illustrates a determination of a tag position in accordance with an illustrative aspect of the present invention.

FIG. 6 illustrates a determination of a tag position in accordance with an illustrative aspect of the present invention. Document space 601 contains keyphrases corresponding to locations 605, 607, and 609 in relation to document origin point 603. Each location corresponds to a horizontal component and a vertical component. Each keyphrase location is measured from origin 603 and an approximate center of the keyphrase. The tag position 611, as determined from EQ. 10a and EQ. 10b, is measured from origin 603 and an approximate center of the tag.

The position of each tag may be determined as described above. However, with an embodiment, the position of another tag may be determined relative to the position of a first tag. For example, the locations of keyphrases corresponding to another salient keyphrase (as represented by another tag) may be measured from a previously determined tag position (e.g., tag position 611) rather than from document origin 603.

Exemplary Screen Shots

FIG. 7 shows screen shot 700 with a thumbnail 701 providing a keyphrase extraction navigation map in accordance with an illustrative aspect of the present invention. Screen shot 700 shows both thumbnail 701 and a displayed portion of document page 201. Thumbnail 701 includes tags 703-709 corresponding to salient keyphrases mobile phone, fashion, jewelry, computer, and car, respectively. Scroll bar 713 shows the relative position of the displayed text in relation to the document page space.

Figure 8:
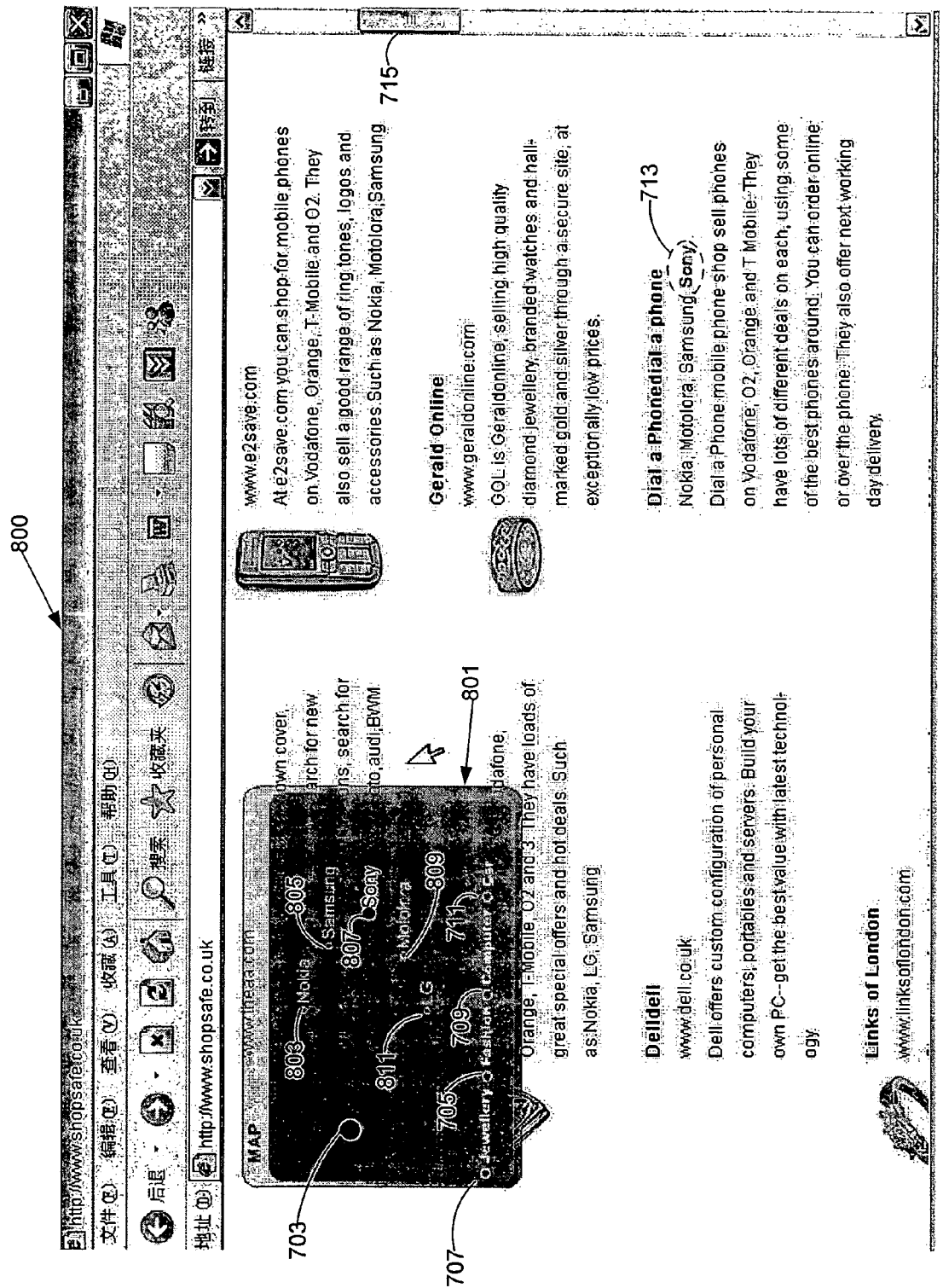
FIG. 8 shows a screen shot in which a salient keyphrase, as shown in a thumbnail, is selected in accordance with an illustrative aspect of the present invention.

FIG. 8 shows a screen shot 800 in which a salient keyphrase, as shown in thumbnail 801, is selected in accordance with an illustrative aspect of the present invention. Screen shot 800 corresponds to screen shot 700, in which a user has selected salient keyphrase mobile phone 703 by pointing to the corresponding tag. In response, associated keyphrases Nokia 803, Samsung 805, Sony 807, Motorola 809, and LG 811 are displayed. In the example shown in FIG. 8, the user further selects Sony 807. Occurrences of keyphrase Sony 807 are highlighted in the displayed document page. The user may navigate the document page by moving scroll bar 811. Tags 705-711 are repositioned in thumbnail 801 when the user has selected salient keyphrase mobile phone 703.

Figure 9:
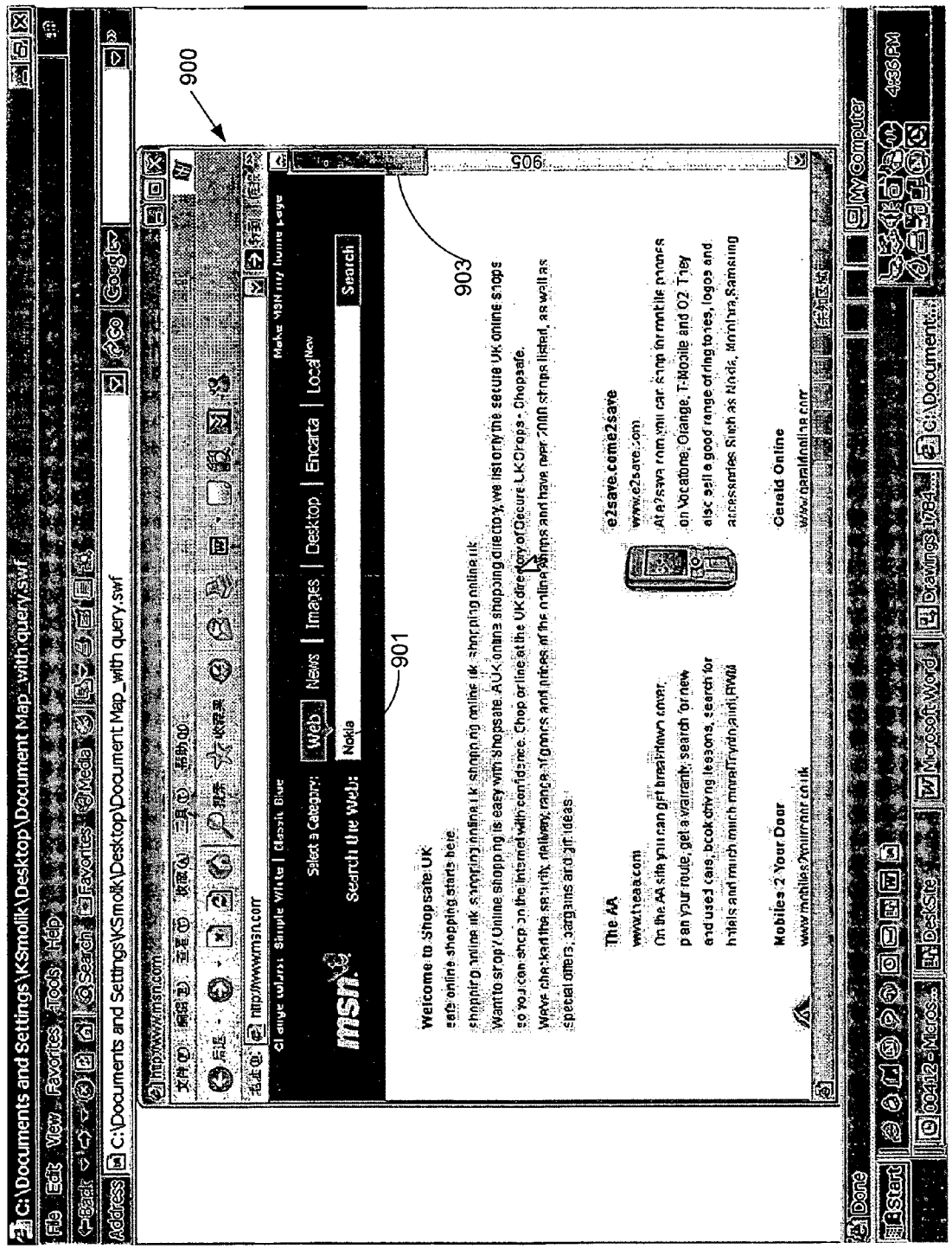
FIG. 9 shows a screen shot in which a keyphrase is entered so that a document may be searched for the keyphrase in accordance with an illustrative aspect of the invention.

FIG. 9 shows screen shot 900 in which keyphrase Nokia 901 is entered by a user so that a document may be searched for the keyphrase in accordance with an illustrative aspect of the invention. The entered keyphrase may be highlighted to facilitate navigation through the document as the user moves scroll bar 903 in document space. In screen shot 900, the document space is represented by display section 905.

Figure 10:
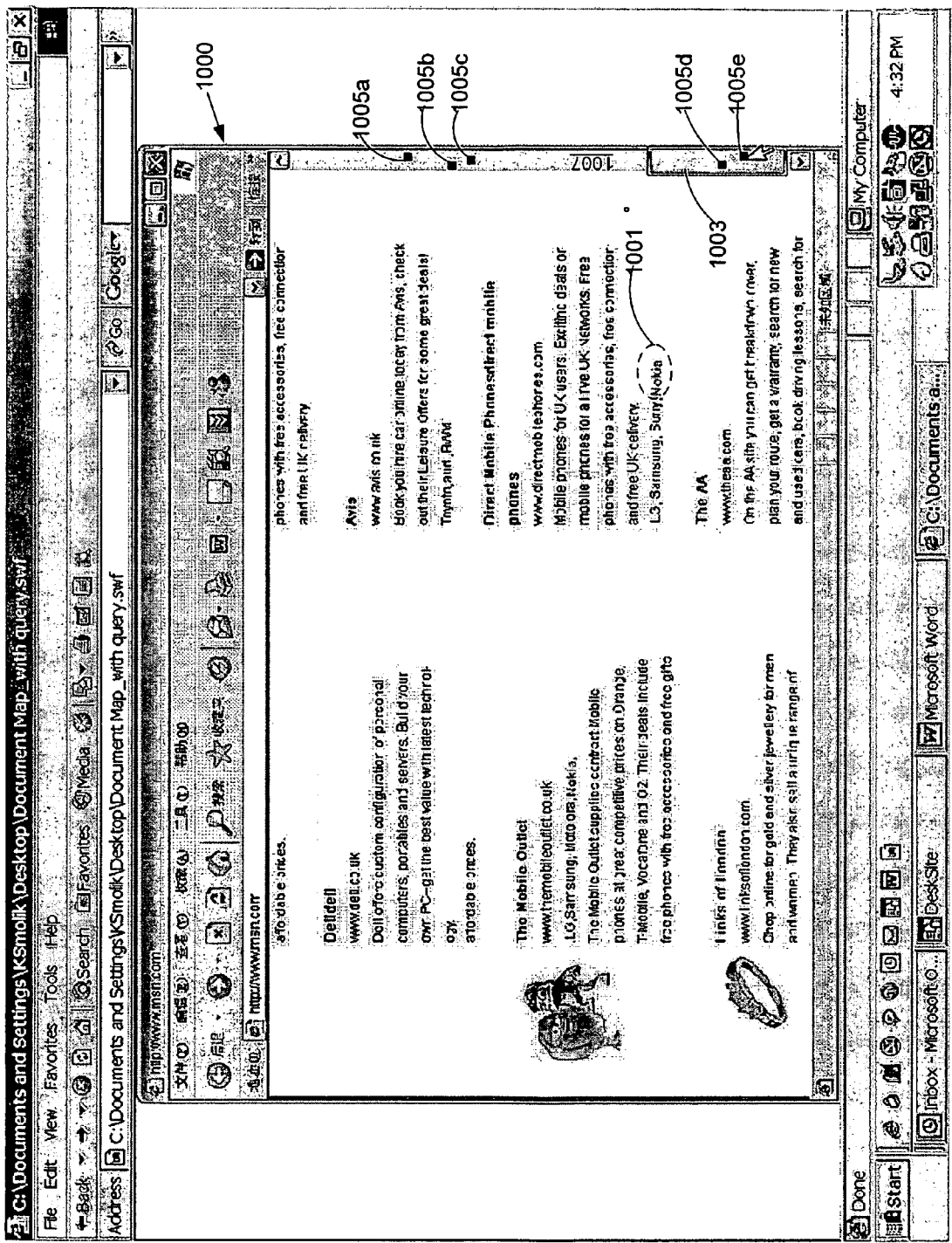
FIG. 10 shows a screen shot in which the selected keyphrase is identified in accordance with an illustrative aspect of the invention.

FIG. 10 shows screen shot 1000 in which keyphrase Nokia 1001 (corresponding to entered keyphrase Nokia 901 as shown in FIG. 9) is identified in accordance with an illustrative aspect of the invention. In an embodiment, all of the occurrences of entered keyphrase Nokia 901 are shown by markings 1005a-1005e in display section 1007. As the user moves scroll bar 1003 over a particular marking, the displayed text is updated with the corresponding occurrence of entered keyphrase Nokia 901.

With an embodiment, the user may point and click to a marking in display section 1007 in order to update the displayed text with the corresponding occurrence of the entered keyphrase.

Referring to FIG. 8, occurrences of the selected keyphrase (e.g., keyphrase Sony 807 as shown in screen shot 800 may be displayed as markings in a display section similar to the markings shown in screen shot 1000.

Usability Testing

Figure 11:
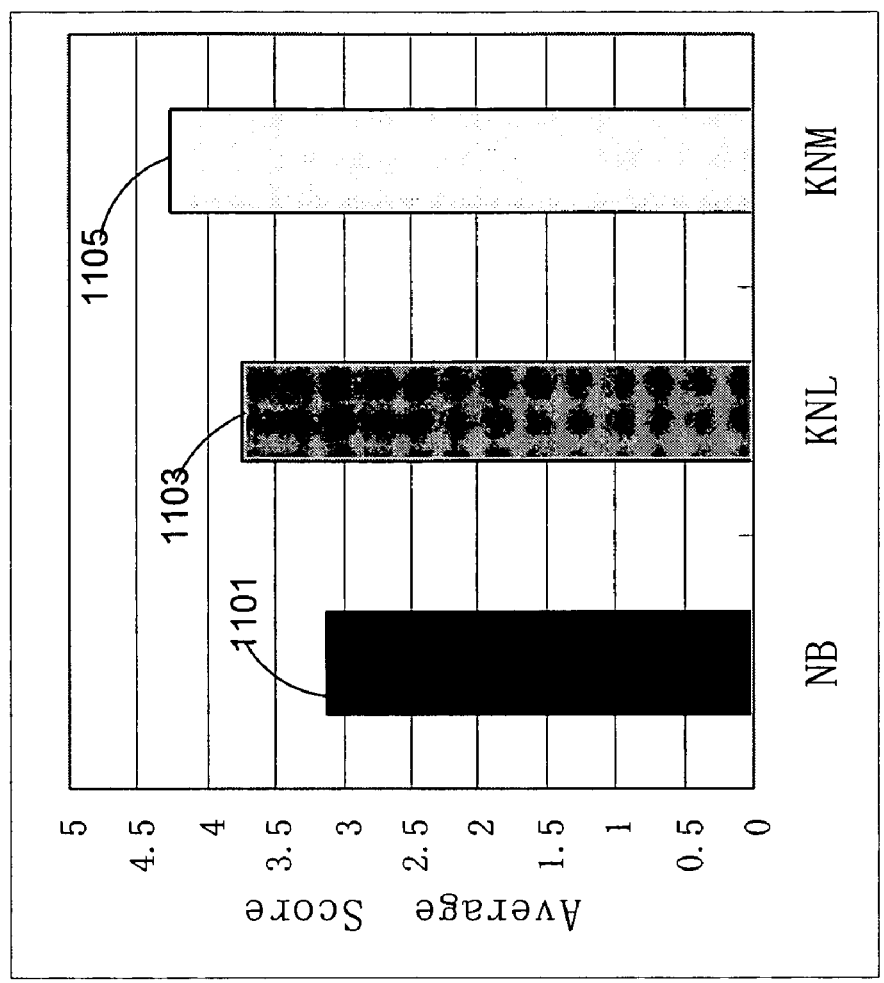
FIG. 11 shows results of a usability test of a keyphrase extraction navigation map (KNM) system in accordance with an illustrative aspect of the invention.

FIG. 11 shows results of usability test 1100 of a KNM system in accordance with an illustrative aspect of the invention. A usability test may be regarded as a step in user-centered design. In the example shown in FIG. 11, a KNM demonstration is built with on webpage navigation. The usability tests spans 20 college participants (consisting of 7 male and 13 female English Department students) for the KNM system. The 20 participants use three different interfaces of web navigation to navigate 10 webpages that are randomly selected from the web:

- the web browser without any summarization (NB)—corresponding to bar 1101
- keyphrases navigation list (KNL) without a navigation map where the keyphrases are arranged as a phrases list by keyphrase salience score—corresponding to bar 1103
- keyphrases navigation map (KNM)—corresponding to bar 1105

Each time that a participant finishes reading a webpage, the participant is asked to give a score to the inter-face he or she just has used in navigating the webpage. The score is from 1 to 5, where a larger score is better. The results shown in FIG. 11 indicate that the average score of KNM (bar 1105) and KNL (bar 1103) are higher than the average score NB (bar 1101). The results suggest that KEX summarization can really help user to navigate the webpage and that the average score of the KNM is better than that of the KNL. The test results further suggest that the position information given by the map assists a reader in navigating a document by helping the reading in summarizing the keyphrases more effectively.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, digital signal processor, and associated peripheral electronic circuitry.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-readable storage medium having computer-executable instructions for performing steps comprising:
   obtaining a first group of associated keyphrases for a document, the first group being associated with a first salient keyphrase;
   obtaining a second group of associated keyphrases for the document, the second group being associated with a second salient keyphrase;
   determining a corresponding location within a page of the document for each associated keyphrase of the first group to form a first collection of locations;
   determining a corresponding location within a page of the document for each associated keyphrase of the second group to form a second collection of locations;
   determining a first tag position from the first collection of locations to represent the locations of the first collection based on averaging of horizontal and vertical components of the locations of the first collection;
   determining a second tag position from the second collection of locations to represent the locations of the second collection based on averaging of horizontal and vertical components of the locations of the second collection;

creating a thumbnail for the page of the document;

drawing a first tag within the thumbnail according to the determined first tag position, the first tag being associated with the first salient keyphrase;

drawing a second tag within the thumbnail according to the determined second tag position, the second tag being associated with the second salient keyphrase;

presenting to a user the thumbnail with the first tag drawn at the first tag position and the second tag drawn at the second tag position; and receiving a selection of a tag from the thumbnail;

presenting to the user related keyphrases in the thumbnail, the related keyphrases being associated with the selected tag; and when the user selects a related keyphrase from the presented thumbnail, presenting to the user a portion of the document corresponding to the selected related keyphrase.

2. The computer-readable storage medium of claim 1 having computer-executable instructions to perform:

receiving a first indication that is indicative of a selected salient keyphrase, the selected salient keyphrase being one of a plurality of salient keyphrases; and displaying related keyphrases in the thumbnail, the related keyphrases being associated with the selected salient keyphrase.

3. The computer-readable storage medium of claim 2 having computer-executable instructions to perform:

receiving a second indication that is indicative of a selected keyphrase, the selected keyphrase being one of the related keyphrases.

4. The computer-readable storage medium of claim 3 having computer-executable instructions to perform:

highlighting the selected keyphrase on a display device.

5. The computer-readable storage medium of claim 2 having computer-executable instructions to perform:

navigating to a portion of the page that is associated with said one of the related keyphrases.

6. The computer-readable storage medium of claim 5, the portion of the page containing a selected occurrence of said one of the related keyphrases.

7. The computer-readable storage medium of claim 2 having computer-executable instructions to perform:

in response to receiving a first indication that is indicative of a selected salient keyphrase, repositioning the first tag and the second tag within the thumbnail.

8. The computer-readable storage medium of claim 1 having computer-executable instructions to perform:

scaling the first tag position in relation to dimensions of the thumbnail.

9. A computer comprising:

a processing unit for executing computer-executable instructions; and a system memory storing computer-executable instructions for performing steps comprising:

obtaining a first group and a second group of associated keyphrases for a document, the first group being associated with a first salient keyphrase, the second group being associated with a second salient keyphrase;

determining a corresponding location within a page of the document for each associated keyphrase of the first group to form a first collection of locations and for each associated keyphrase of the second group to form a second collection of locations;

determining a first tag position based on averaging of horizontal and vertical components of the locations of the first collection and a second tag position based on averaging of horizontal and vertical components of the locations of the second collection;

creating a thumbnail for the page of the document;

drawing a first tag within the thumbnail according to the determined first tag position, the first tag being associated with the first salient keyphrase;

drawing a second tag within the thumbnail according to the determined second tag position, the second tag position being associated with the second salient keyphrase;

presenting to a user the thumbnail with the first tag drawn at the first tag position and the second tag drawn at the second tag position;

receiving a selection of a tag from the thumbnail;

presenting to the user related keyphrases in the thumbnail, the related keyphrases being associated with the selected tag; and when the user selects a related keyphrase from the presented thumbnail, presenting to the user a portion of the document corresponding to the selected related keyphrase.

10. The computer of claim 9 wherein the computer-executable instructions are for performing steps that further comprise:

receiving a first indication that is indicative of a selected salient keyphrase, the selected salient keyphrase being one of a plurality of salient keyphrases; and displaying related keyphrases in the thumbnail, the related keyphrases being associated with the selected salient keyphrase.

11. The computer of claim 10 wherein the computer-executable instructions are for performing steps that further comprise:

receiving a second indication that is indicative of a selected keyphrase, the selected keyphrase being one of the related keyphrases.

12. The computer of claim 11 wherein the computer-executable instructions for performing steps that further comprise:

highlighting the selected keyphrase on a display device.

13. The computer of claim 12 wherein the portion of the page containing a selected occurrence of said one of the related keyphrases.

14. The computer of claim 10 wherein the computer-executable instructions are for performing steps that further comprise:

navigating to a portion of the page that is associated with said one of the related keyphrases.

15. The computer of claim 10 wherein the computer-executable instructions are for performing steps that further comprise:

in response to receiving a first indication that is indicative of a selected salient keyphrase, repositioning the first tag and the second tag within the thumbnail.

16. The computer of claim 9 wherein the computer-executable instructions are for performing steps that further comprise:

scaling the first tag position in relation to dimensions of the thumbnail.

17. A method comprising:

obtaining a first group and a second group of associated keyphrases for a document, the first group being associated with a first salient keyphrase, the second group being associated with a second salient keyphrase;

determining a corresponding location within a page of the document for each associated keyphrase of the first group to form a first collection of locations and for each associated keyphrase of the second group to form a second collection of locations;

determining a first tag position based on averaging of horizontal and vertical components of the locations of the first collection and a second tag position based on averaging of horizontal and vertical components of the locations of the second collection;

creating a thumbnail for the page of the document;

drawing a first tag within the thumbnail according to the determined first tag position, the first tag being associated with the first salient keyphrase;

drawing a second tag within the thumbnail according to the determined second tag position, the second tag position being associated with the second salient keyphrase;

presenting to a user the thumbnail with the first tag drawn at the first tag position and the second tag drawn at the second tag position;

receiving a selection of a tag from the thumbnail;

presenting to the user related keyphrases in the thumbnail, the related keyphrases being associated with the selected tag; and when the user selects a related keyphrase from the presented thumbnail, presenting to the user a portion of the document corresponding to the selected related keyphrase.

18. The method of claim 17 including:

receiving a first indication that is indicative of a selected salient keyphrase, the selected salient keyphrase being one of a plurality of salient keyphrases; and displaying related keyphrases in the thumbnail, the related keyphrases being associated with the selected salient keyphrase.

19. The method of claim 17 including:

receiving a second indication that is indicative of a selected keyphrase, the selected keyphrase being one of the related keyphrases.

20. The method of claim 17 including:

scaling the first tag position in relation to dimensions of the thumbnail.

* * * * *